(12) United States Patent
Curtin et al.

(10) Patent No.: US 8,037,781 B2
(45) Date of Patent: Oct. 18, 2011

(54) TELESCOPING STEERING SYSTEM AND WATER VEHICLE INCLUDING THE SAME

(75) Inventors: Michael Augustin Curtin, Newnan, GA (US); Kenichi Otsuka, Newnan, GA (US)

(73) Assignee: Yamaha Motor Manufacturing Corporation of America, Newnan, GA (US)

( * ) Notice: Subject to any disclaimer, the term of this patent is extended or adjusted under 35 U.S.C. 154(b) by 739 days.

(21) Appl. No.: 12/178,081

(22) Filed: Jul. 23, 2008

(65) Prior Publication Data
US 2010/0018342 A1   Jan. 28, 2010

(51) Int. Cl.
  *B62D 1/18* (2006.01)
  *B63H 25/04* (2006.01)
(52) U.S. Cl. .................. 74/493; 114/144 R; 280/775
(58) Field of Classification Search ............ 74/492, 74/493, 551.1–551.5, 527; 114/144 R, 55.52, 114/270; 280/16, 775, 771, 778, 263, 267, 280/93.502, 93.507, 93.508
See application file for complete search history.

(56) References Cited

U.S. PATENT DOCUMENTS

| 4,726,311 | A | * | 2/1988 | Niina ..................... 114/144 R |
| 4,896,559 | A | | 1/1990 | Marier et al. |
| 5,056,450 | A | | 10/1991 | Mardikian |
| 5,372,082 | A | | 12/1994 | Hattori |
| 5,622,132 | A | | 4/1997 | Mardikian |
| 5,943,979 | A | | 8/1999 | Hattori |
| 6,019,054 | A | | 2/2000 | Hattori et al. |
| 6,055,922 | A | | 5/2000 | Madachi et al. |
| 6,062,154 | A | | 5/2000 | Ito |
| 6,105,528 | A | | 8/2000 | Kuroi et al. |
| 6,202,583 | B1 | | 3/2001 | Asakura |
| 6,202,584 | B1 | | 3/2001 | Madachi et al. |
| 6,276,291 | B1 | | 8/2001 | Lapointe et al. |
| 6,929,278 | B2 | | 8/2005 | Vaisanen |
| 6,959,661 | B2 | | 11/2005 | Nakajima et al. |
| 7,017,507 | B2 | | 3/2006 | Hattori et al. |

(Continued)

FOREIGN PATENT DOCUMENTS

| JP | 61-181797 A | 8/1986 |
| JP | 1-122390 U | 8/1989 |
| JP | 2-12994 U | 1/1990 |
| JP | 2-34397 U | 3/1990 |

*Primary Examiner* — Robert Pezzuto
(74) *Attorney, Agent, or Firm* — Keating & Bennett, LLP

(57) ABSTRACT

A steering system for a water vehicle includes a housing having a substantially cylindrical member, at least one case member extending through the substantially cylindrical member, a column shaft extending through the pair of case members, including at least one elongated hole disposed on opposed side of the column shaft, and being arranged to move relative to the pair of case members and the housing in an axial direction of the column shaft, and a telescoping mechanism partially disposed in the column shaft. One of the pair of case members includes a plurality of detents provided on an inner surface thereof. The telescoping mechanism includes at least one elongated hole disposed at one end portion of the telescoping mechanism, a locking pin extending through the at least one elongated hole in the telescoping mechanism and the at least one elongated hole in the column shaft, and a lever disposed at an opposite end portion from the one end portion of the telescoping mechanism. The lever is movable to move the locking pin into and out of engagement with respective ones of the plurality of detents to enable the column shaft to be selectively moved relative to the pair of case members and the housing and fixed at a desired location relative to the pair of case members and the housing.

8 Claims, 10 Drawing Sheets

U.S. PATENT DOCUMENTS

| | | |
|---|---|---|
| 7,137,348 B2 | 11/2006 | Kamio et al. |
| 7,194,974 B2 | 3/2007 | Kamio |
| 7,341,013 B2 | 3/2008 | Yoshiki |
| 7,357,090 B2 | 4/2008 | Spade et al. |
| 7,559,576 B1 * | 7/2009 | Honkala et al. ............... 280/775 |
| 2007/0034128 A1 | 2/2007 | Spade et al. |

* cited by examiner

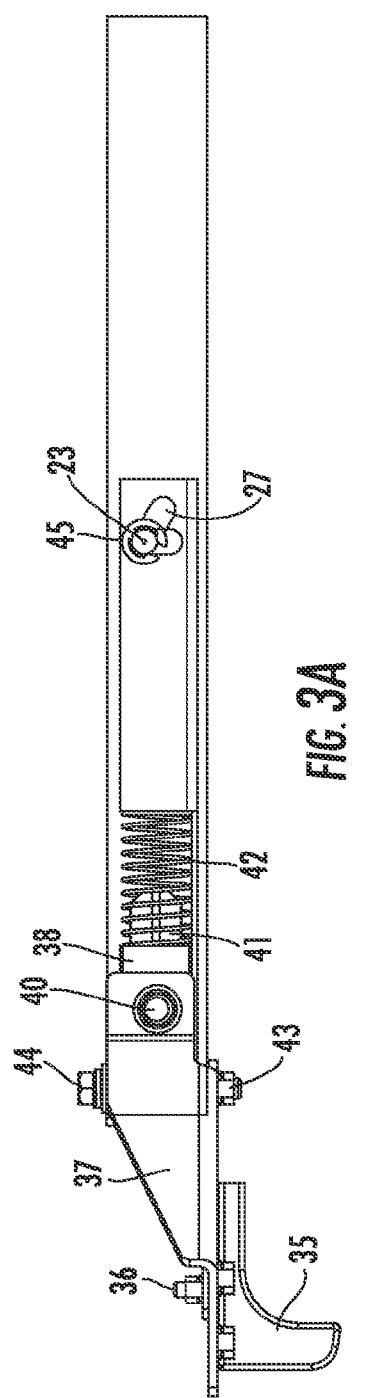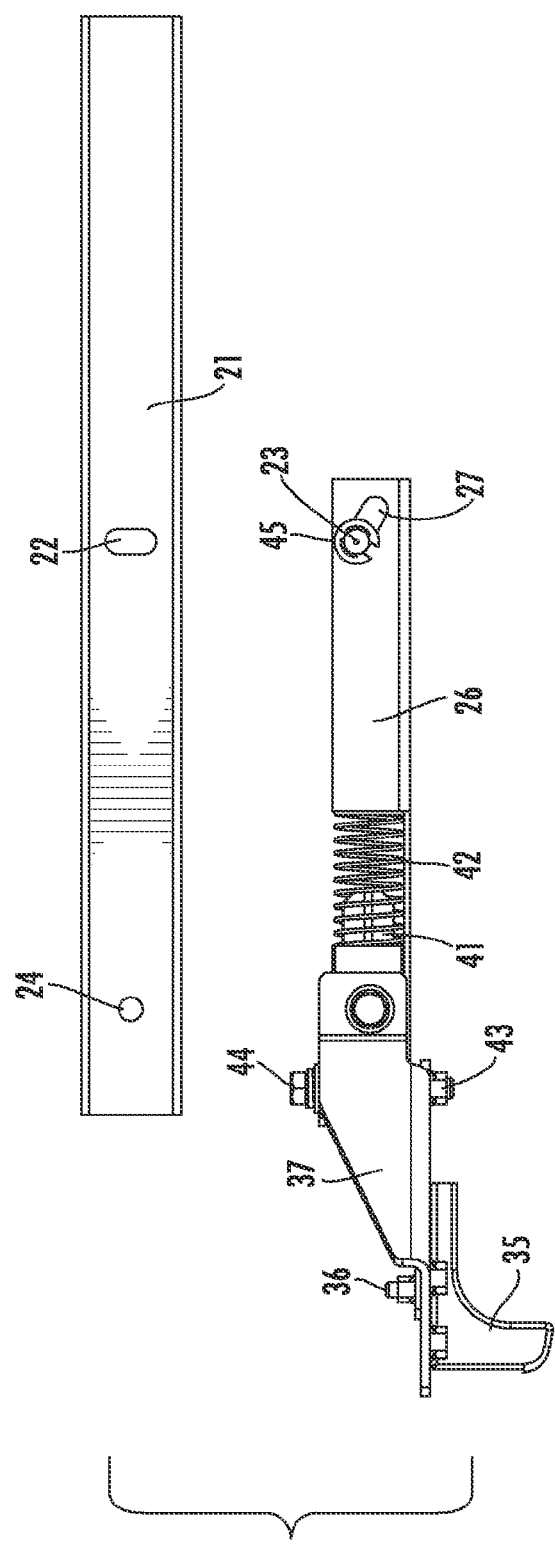

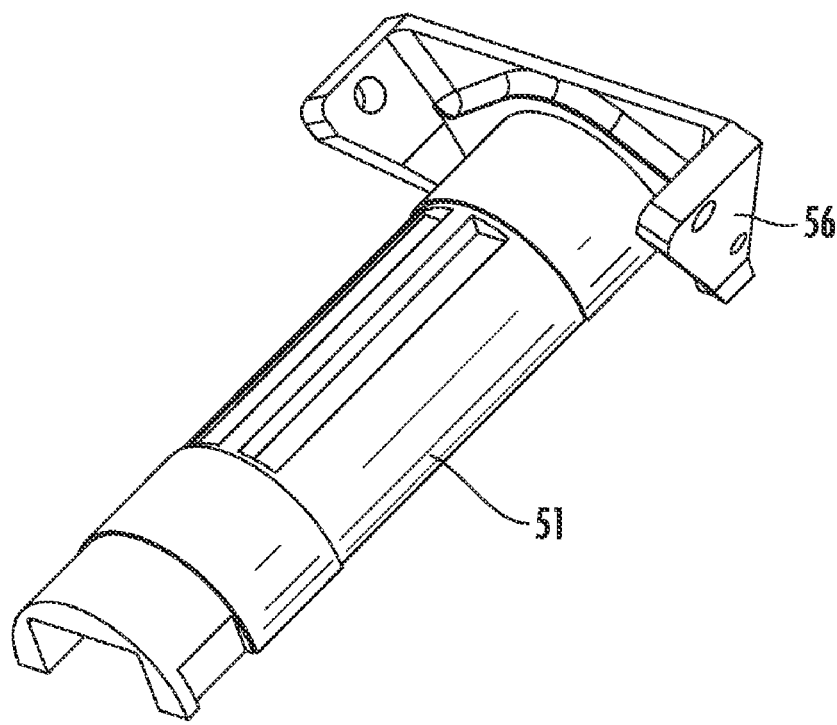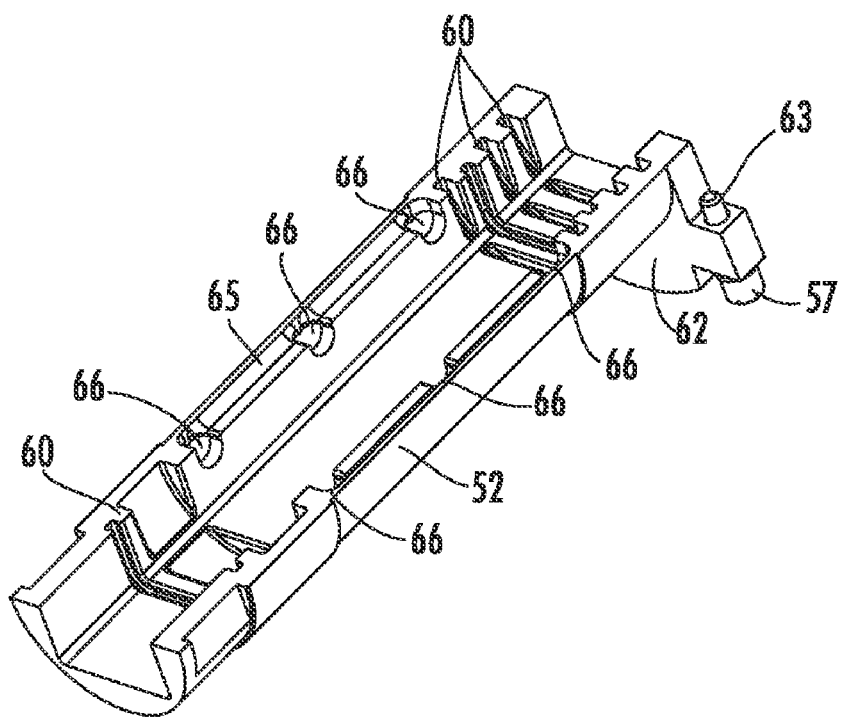
FIG. 7

TELESCOPING STEERING SYSTEM AND WATER VEHICLE INCLUDING THE SAME

BACKGROUND OF THE INVENTION

1. Field of the Invention

The present invention relates to a steering column, and more particularly, to a telescoping steering system for a personal watercraft (PWC).

2. Description of the Related Art

In order to provide for adjustment of a steering mechanism in a PWC, various types of adjustable steering systems have been used.

JP 2-34397 U discloses a steering mechanism for a PWC which includes a tilting mechanism that enables the tilt of the handle bars to be variably adjusted. However, the tilting mechanism changes the orientation of the handle bars with respect to a rider, which adversely affects the drivability of the PWC.

JP 1-122390 U discloses a steering mechanism for a PWC which includes a telescoping mechanism that enables the height of the handle bars to be changed. However, the telescoping mechanism requires a hydraulic cylinder to perform the height adjustment of the handle bars. Thus, the telescoping mechanism has a complicated configuration and is expensive, which increases the overall cost of the PWC.

U.S. Pat. No. 7,137,348 discloses a steering mechanism for a PWC which includes a simplified telescoping mechanism. Particularly, the telescoping mechanism disclosed in U.S. Pat. No. 7,137,348 includes two components that are moveable relative to one another. One of the two components includes the handle bars attached thereto. Each of the two components includes engagement teeth that correspond to each other. A threaded fastening member is arranged to clamp the two components together with the engagement teeth engaged with one another so as to set the height of the handle bars. When adjusting the height of the handle bars, the fastening member is rotated to loosen the clamping force of the fastening member and enable disengagement of the engagement teeth of the two components.

Although the telescoping mechanism disclosed in U.S. Pat. No. 7,137,348 is simplified, it is extremely difficult to adjust the height of the handle bars while traveling on the PWC because of the arrangement of the fastening member.

JP 61-181797 B2 discloses another steering mechanism for a PWC which includes a telescoping mechanism. However, the telescoping mechanism disclosed in JP 61-181797 B2 does not include any locking devices. Thus, it not possible to lock the handle bars at a plurality of desired heights.

SUMMARY OF THE INVENTION

To overcome the problems described above, preferred embodiments of the present invention provide a telescoping steering system for a water vehicle and a water vehicle including the telescoping steering system.

A steering system for a water vehicle according to a preferred embodiment of the present invention includes a housing having a substantially cylindrical member, at least one case member extending through the substantially cylindrical member, a column shaft extending through the pair of case members, including at least one elongated hole disposed on opposed sides of the column shaft, and being arranged to move relative to the pair of case members and the housing in an axial direction of the column shaft, and a telescoping mechanism partially disposed in the column shaft. One of the pair of case members includes a plurality of detents provided on an inner surface thereof. The telescoping mechanism includes at least one elongated hole disposed at one end portion of the telescoping mechanism, a locking pin extending through the at least one elongated hole in the telescoping mechanism and the at least one elongated hole in the column shaft, and a lever disposed at an opposite end portion from the one end portion of the telescoping mechanism. The lever is movable to move the locking pin into and out of engagement with respective ones of the plurality of detents to enable the column shaft to be selectively moved relative to the pair of case members and the housing and fixed at a desired location relative to the pair of case members and the housing.

Preferably, each of the at least one case member includes a flange at one end thereof that is engaged with one end portion of the substantially cylindrical member of the housing.

The steering system preferably further includes an arm member, and a clamping member. The at least one case member preferably includes a pair of case members, the arm member and the clamping member are disposed around an end of the pair of case members opposite to the one end of the at least one case member to clamp the pair of case member together, and the arm member and the case member are engaged with an end of the substantially cylindrical member of the housing opposite to the one end thereof.

The steering system preferably further includes a plurality of telescoping bushings disposed around the column shaft and including a lip portion, wherein the at least one case member includes a plurality of slots arranged to receive the lip of a respective one of the plurality of the plurality of telescoping bushings therein so as to fix the locations of the plurality of telescoping bushings, and the column shaft is slidable relative to the plurality of telescoping bushings.

The steering system according preferably further includes a plurality of rotational bushings disposed around the at least one case member and between the at least one case member and the substantially cylindrical member of the housing, wherein the at least one case member is rotatable relative to the plurality of rotational bushings and the substantially cylindrical member of the housing.

The telescoping mechanism preferably further includes a substantially U-shaped member and a plate-shaped member extending from an end of the substantially U-shaped member, the elongated holes of the telescoping mechanism are arranged in opposed side surfaces of the substantially U-shaped member, and the lever is attached to an end of the plate-shaped member opposite to the substantially U-shaped member.

Preferably, the steering system includes a handle bar bracket attached to an end of the column shaft, wherein the lever is slidably attached to the handle bar bracket.

Preferably, the steering system further includes a block member attached to the handle bar bracket, and a biasing member disposed between the block member and a portion of the telescoping mechanism and arranged to bias the lever in a direction toward the housing.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 3A is a side view of a portion of the telescoping steering system shown in FIG. 1A.

FIG. 3B is an exploded view of the portion of the telescoping steering system shown in FIG. 3A

FIG. 7 is an exploded view of another component of the telescoping steering system shown in FIG. 1A.

DETAILED DESCRIPTION OF PREFERRED EMBODIMENTS

Preferred embodiments of the present invention will be described below with reference to the drawings.

FIGS. 1A to 1D show the assembled telescoping steering system which includes a housing 10 and a column assembly 20 extending through the housing 10.

Figure 2:
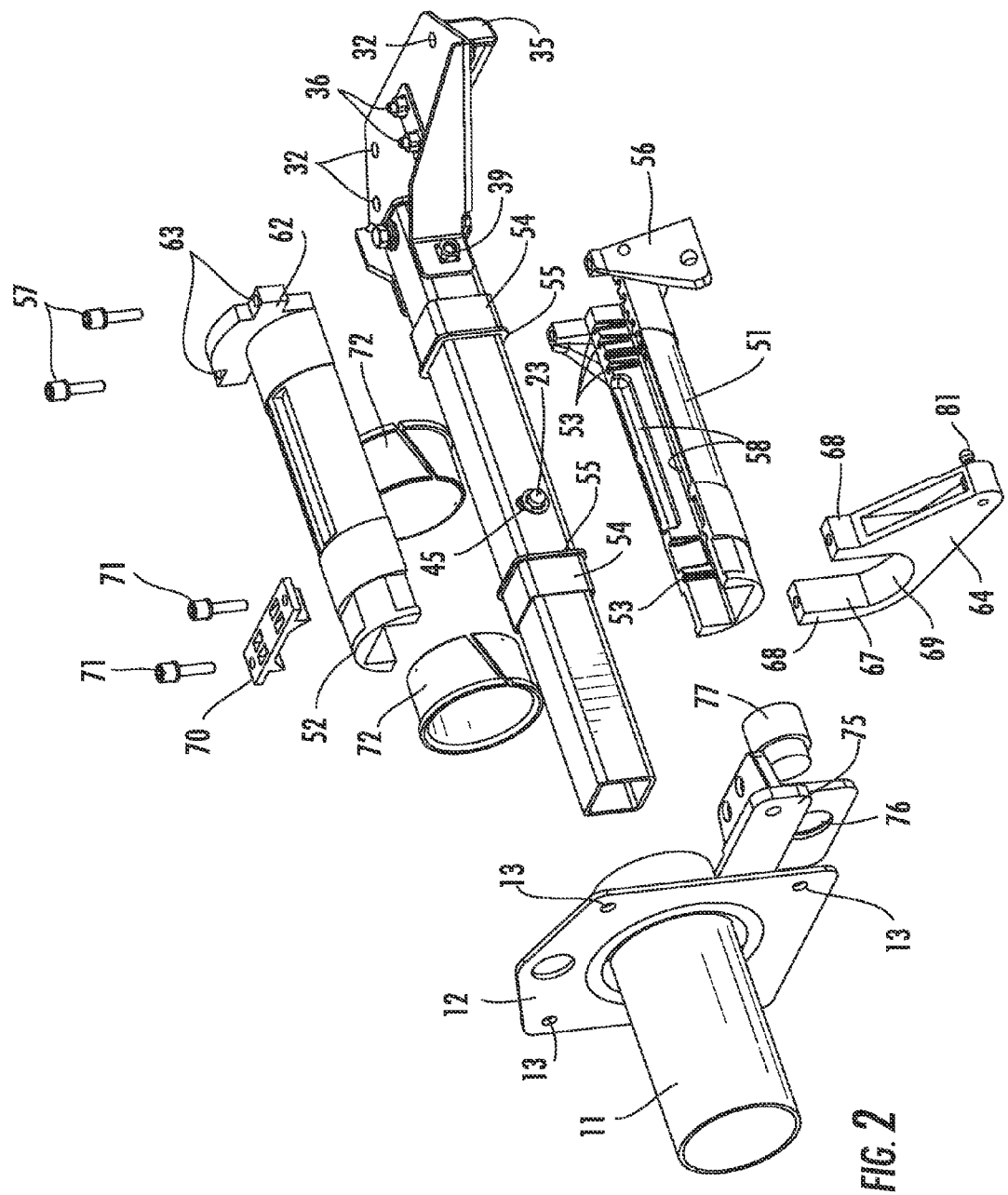
FIG. 2 is an exploded view of the telescoping steering system shown in FIG. 1A.
Figure 4A:
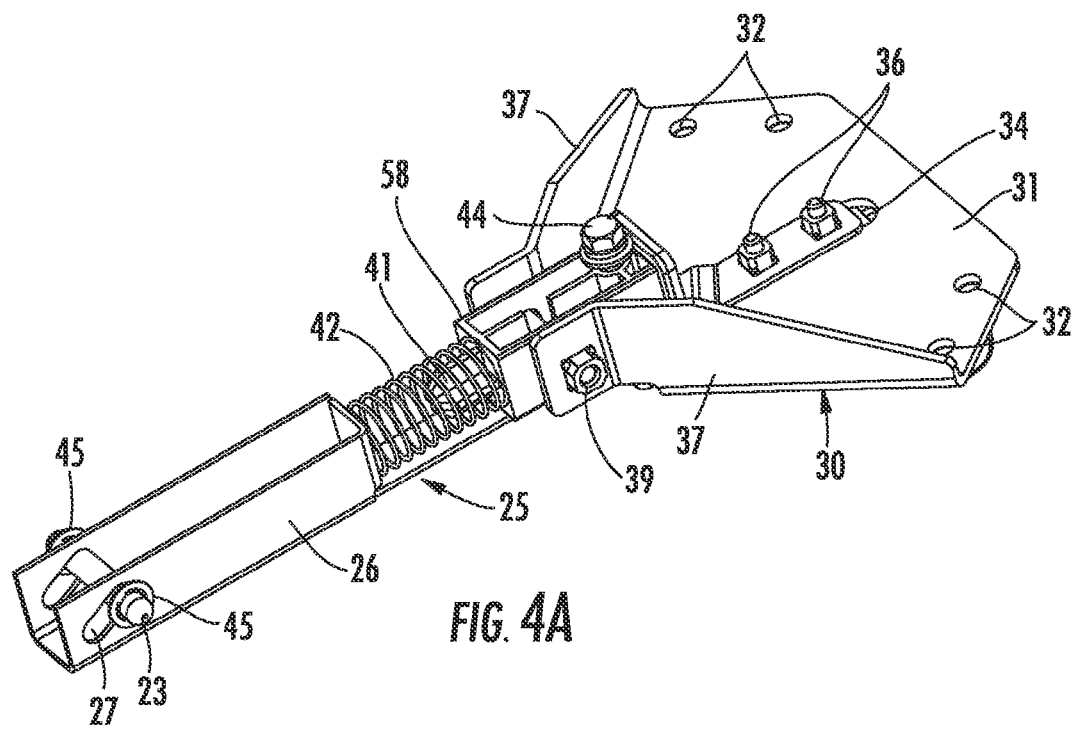
FIG. 4A is a perspective view of a portion of the telescoping steering system shown in FIG. 1A.
Figure 4B:
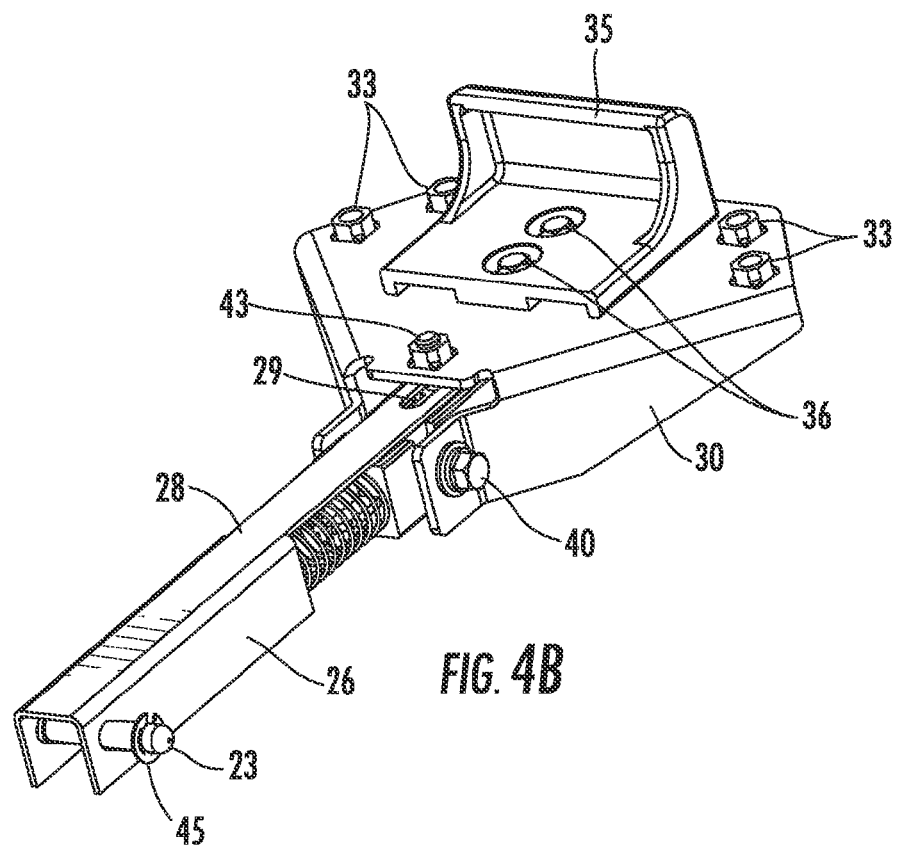
FIG. 4B is another perspective view of the portion of the telescoping steering system shown in FIG. 4A.
Figure 5:
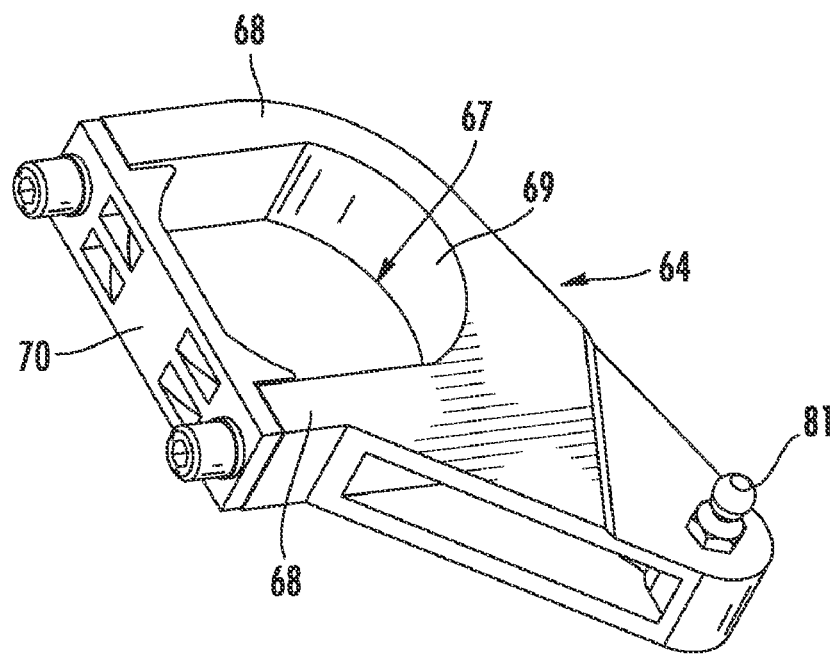
FIG. 5 is a perspective view of a component of the telescoping steering system shown in FIG. 1A.
Figure 6:
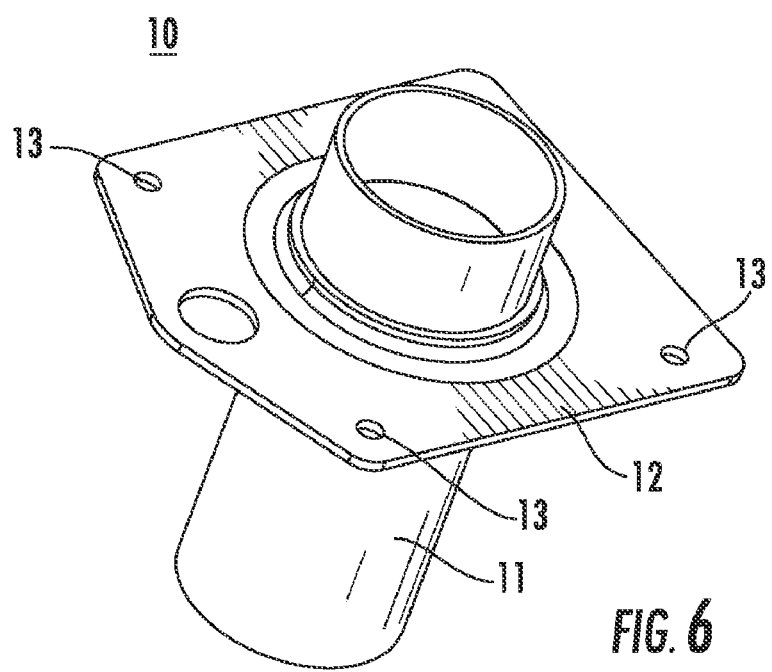
FIG. 6 is a perspective view of another component of the telescoping steering system shown in FIG. 1A.

As best seen in FIGS. 2 and 6, the housing 10 includes a cylindrical or substantially cylindrical portion 11 and a plate 12 which is configured to be attached to a deck 91 (see FIGS. 9 and 10) of a PWC 90. The cylindrical portion 11 extends though and is attached to the plate 12. Any suitable attachment method may be used, such as welding, press fitting, or mechanical fasteners such as bolts, rivets, and screws, for example.

The plate 12 includes a plurality of holes 13 through which fasteners (not shown) extend to attach the plate 12 to the deck (not shown). Any suitable fastener may be used to attach the plate 12 to the deck 91 of the PWC 90, such as screws, bolts, and rivets, for example.

As best seen in FIGS. 2-4B, the column assembly 20 includes a column shaft 21 and including elongated holes 22 in opposed side surfaces of the column shaft 21 through which a locking pin 23 extends. In the preferred embodiment, the cross-section of the column shaft 21 preferably has a substantially square shape. However, the column shaft 21 may have any suitable shape. The elongated holes 22 extend in a direction that is substantially perpendicular to a direction in which the column shaft 21 extends. However, the elongated holes 22 may extend in any suitable direction. The column shaft 21 also includes holes 24 in the opposed side surfaces of the column shaft 21 in which the elongated holes 22 are provided.

A telescoping mechanism 25 includes a substantially U-shaped member 26 having elongated holes 27 provided in opposed side surfaces of the substantially U-shaped member 26 through which the locking pin 23 extends. In the present preferred embodiment, the elongated holes 27 extend in an oblique direction with respect to the vertical direction of the elongated holes 22 provided in the column shaft 21. A plate-shaped member 28 extends from an end of the substantially U-shaped member 26. The plate-shaped member 28 includes an elongated hole 29 in a central portion thereof. The telescoping mechanism 25 preferably is slidably attached to a handle bar bracket 30 via the elongated hole 29.

Figure 8:
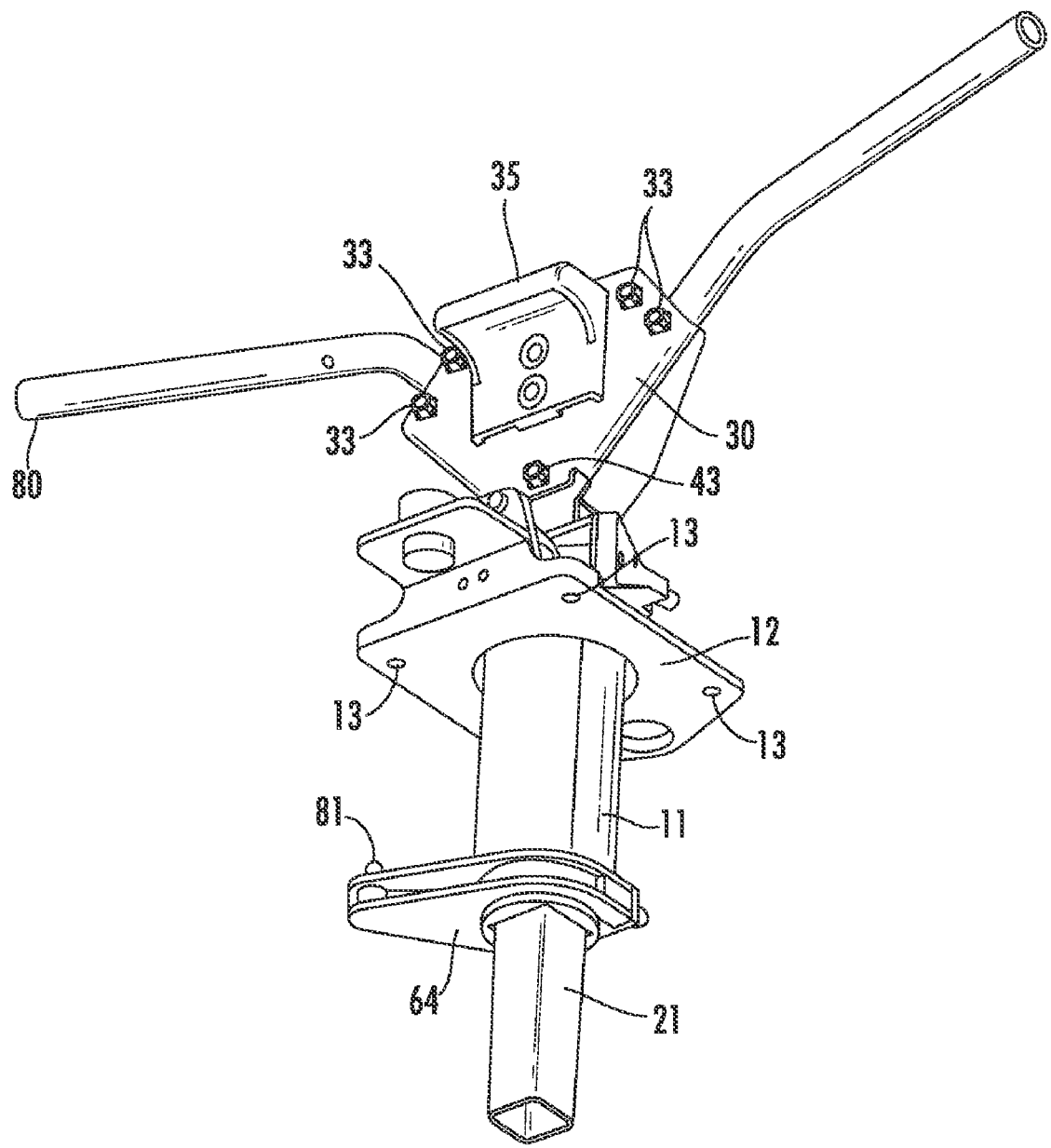
FIG. 8 is a perspective view of the telescoping steering system shown in FIG. 1A including handle bars attached thereto.

The handle bar bracket 30 includes a substantially flat plate-shaped member 31 including a plurality of holes 32 arranged to enable attachment of handle bars 80 (see FIG. 8) to the handle bar bracket 30. In the present preferred embodiment, nuts 33 preferably are attached to a lower surface of the plate-shaped member 31 of the handle bar bracket 30 by welding, for example. The nuts 33 are arranged to receive fasteners, such as bolts (not shown), to attach the handle bars 80 (see FIG. 8) to the handle bar bracket 30. However, any suitable attachment structure may be provided to attach the handle bars to the handle bar bracket 30. In the present preferred embodiment of the present invention, the handle bar bracket 30 preferably has a substantially polygonal shape. However, the handle bar bracket 30 may have any suitable shape.

An elongated slot 34 is provided in a central portion of the plate-shaped member 31. A lever 35 and an end portion of the plate-shaped member 28 are disposed on opposite sides of the plate-shaped member 31 to sandwich the plate-shaped member 31 therebetween. However, any suitable arrangement of the lever 35 and the plate-shaped member 28 may be used. The lever 35 and the plate-shaped member 28 are attached to one another via fasteners 36 extending through the elongated slot 34, such that the lever 35 and the plate-shaped member 28 are movable relative to the handle bar bracket 30. The telescoping mechanism 25 can be moved relative to the handle bar bracket 30 by pulling the lever 35 upwardly.

The handle bar bracket 30 further includes sidewalls 37 that extend in planes that are substantially perpendicular to a plane in which the plate shaped member 31 extends. A block member 38 is disposed between and attached to portions of the sidewalls 37. In the present preferred embodiment, a nut 39 is attached to one of the sidewalls 37, and a bolt 40 extends through holes in the sidewalls 37 and in the block member 38 and is engaged with the nut 39 to fix the block member 38 to the handle bar bracket 30. However, any suitable fastener may be used to attach the block member 38 to the sidewalls 37 of the handle bar bracket 30.

The block member 38 includes a projection 41 extending in a direction away from the handle bar bracket 30. A biasing member 42 is disposed over the projection 41 and extends between the substantially U-shaped member 26 and the block member 38. The biasing member 42 is arranged to bias the telescoping mechanism 25 in a direction away from the handle bar bracket 30. In the present preferred embodiment of the present invention, the biasing member 42 preferably is a coil spring. However, any suitable biasing member may be used, such as pneumatic or hydraulic cylinders, leaf springs, compressed rubber, and torsion springs, for example.

As shown in FIGS. 2 and 3A, the U-shaped member 26 of the telescoping mechanism 25 is inserted into the column shaft 21 such that the column shaft 21 extends over the telescoping mechanism 25 and the block member 28, and the column shaft 21 is attached to the handle bar bracket 30 via fasteners 39, 40, 43, and 44. In the present preferred embodiment, the fasteners 39, 40, 43, and 44 preferably are nuts and bolts. However, any suitable fasteners may be used. When the column shaft 21 is attached to the handle bar bracket 30, the elongated holes 22 and 27 are aligned with one another, and the locking pin 23 is inserted into the elongated holes 22 and 27. The locking pin 23 is secured in the elongated holes 22 and 27 preferably by an E-ring 45 provided at both end portions of the locking pin 23. However, any suitable securing devices may be used, such as cotter pins, spring clips, star clips, and locking nuts. Alternatively, the locking pin 23 may be replaced with a shoulder bolt.

As shown in FIGS. 2, 7A, and 7B, two case members 51 and 52 are arranged around the column shaft 21. As shown in FIGS. 2 and 7A, the case member 51 includes a plurality of slots 53 disposed at opposed ends of an interior cavity of the case member 51. Each of the slots 53 is configured to accommodate a lip portion 55 of a respective one of the telescoping bushings 54. The telescoping bushings 54 are slidably disposed on the column shaft 21. The case members 51 and 52 are fixed with respect to the deck 91 of the PWC 90. The multiple slots 53 provide at one end of each of the case members 51 are provided to reduce the wall thickness at a thick area of the case members, which is preferable when manufacturing the case members 51, by die casting, for example.

The case member 51 includes a flange portion 56 which extends from an end portion of the case member 51. The flange portion 56 includes a pair of threaded holes arranged to accommodate threaded fasteners 57. The case member 51 further includes a pair of slots 58 in which the locking pin 23 is slidably disposed. The depth and shape of each of the slots 58 are substantially consistent along the entire length of the slots 58.

As shown in FIGS. 2 and 7B, the case member 52 includes a plurality of slots 60, similar to the slots 53 in the case member 51, disposed at opposed ends of an interior cavity of the case member 52. Each of the slots 60 is configured to accommodate the lip portion 55 of a respective one of the telescoping bushings 54.

In addition, the case member includes a flange portion 62 which extends from an end of the case member 52, and is configured to mate with the flange portion 56 of the case members 1. The flange portion 62 includes two through holes 63 through which the threaded fasteners 57 extend. The case members 51 and 52 are arranged to surround the column shaft 21 and to be fixed in this arrangement via the flange portion 56 and 62 and the threaded fasteners 57 provided at one end of the case members 51 and 52, and via an arm member 64 provided at the other end of the case members 51 and 52. The arm member includes a coupling member 81 for coupling a connecting rod (not shown) which connects the steering column assembly 20 to a steering cable or a position sensor (not shown), for example.

As shown in FIG. 7B, the case member 52 further includes a pair of slots 65 in which the locking pin 23 is slidably disposed. Each of the slots 65 includes a plurality of detents 66 into which the locking pin 23 can be disposed to fix the handle bars of a PWC in a plurality of different telescoping positions. In the present preferred embodiment, three detents are provided in each slot 65. However, any suitable number of detents 66 may be provided.

As shown in FIGS. 1A-2 and 5, the arm member 64 includes a substantially U-shaped opening 67 defined by two substantially parallel sidewalls 68 and a curved bottom surface 69. The substantially U-shaped opening 67 is configured to extend around an end portion of the case members 51 and 52 when the case members 51 and 52 are mated to one another. The arm member 64 is disposed around the end of the case members 51 and 52 and a clamping member 70 is attached to the arm member 64 with the mated case members 51 and 52 clamped therebetween. In the present preferred embodiment, the clamping member 70 is attached to the arm member 64 via threaded fasteners 71. However, any suitable fastener may be used to attach the clamping member 70 to the arm member 64.

The end portions of the case members 51 and 52 around which the arm member 64 and the clamping member 70 are disposed are configured to have a shape that corresponds to the substantially U-shaped opening 67 and a surface of the clamping member 70 that is in contact with the case members 51 and 52. In the present preferred embodiment, the end portions of the case members 51 and 52 around which the arm member 64 and the clamping member 70 are disposed include a plurality of flat and curved portions. However, any suitable configuration of the end portions of the case members 51 and 52 may be used as long as the configuration corresponds to the opening 67 and the surface of the clamping member 70 that is in contact with the case members 51 and 52.

Figure 1A:
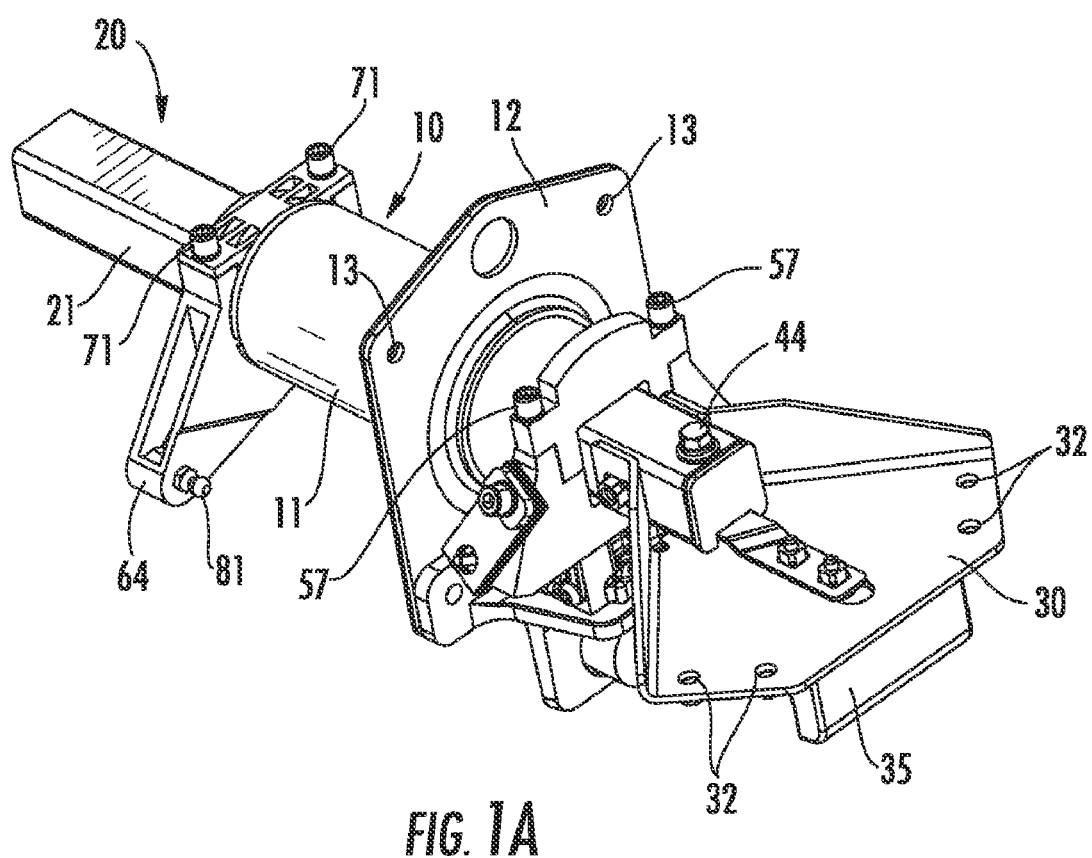
FIG. 1A is a perspective view of a telescoping steering system according to a preferred embodiment of the present invention.
Figure 1B:
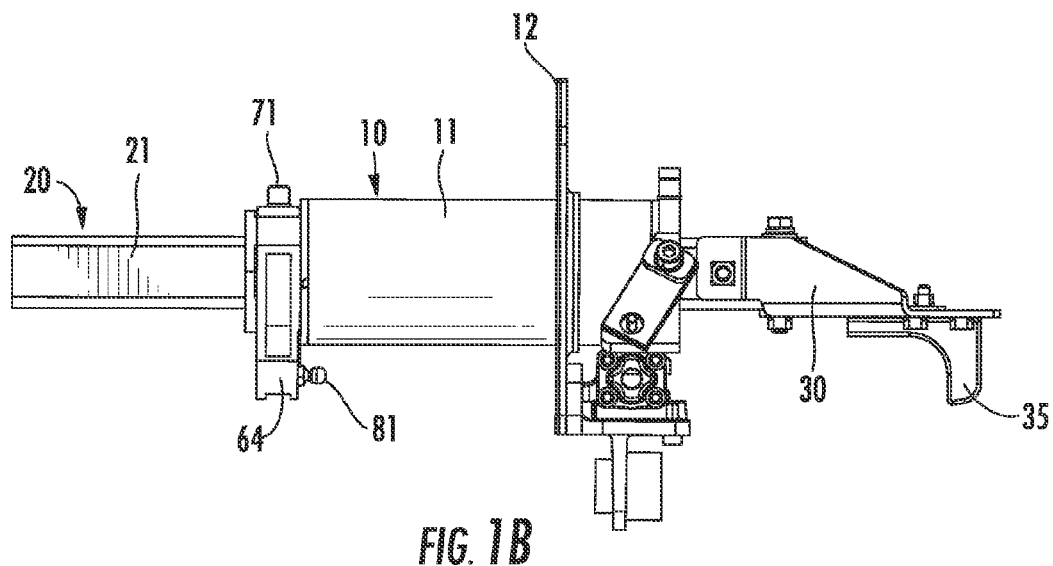
FIG. 1B is a side view of the telescoping steering system shown in FIG. 1A.
Figure 1C:
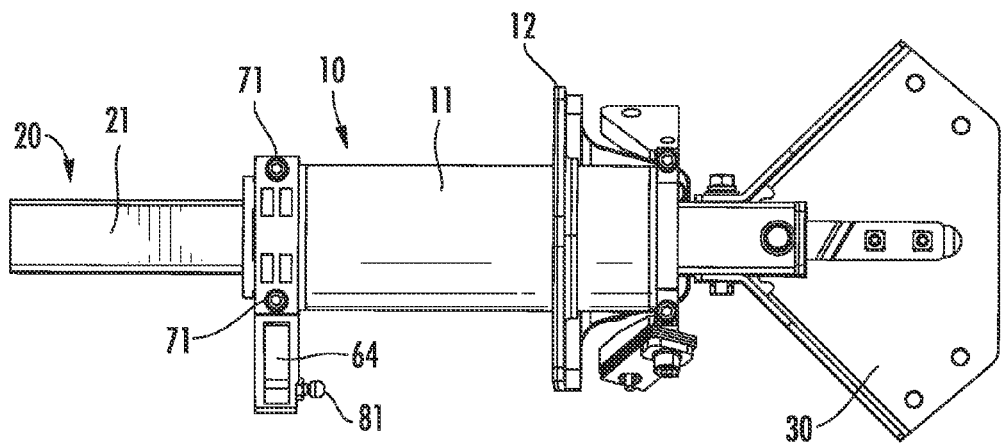
FIG. 1C is a top view of the telescoping steering system shown in FIG. 1A.
Figure 1D:
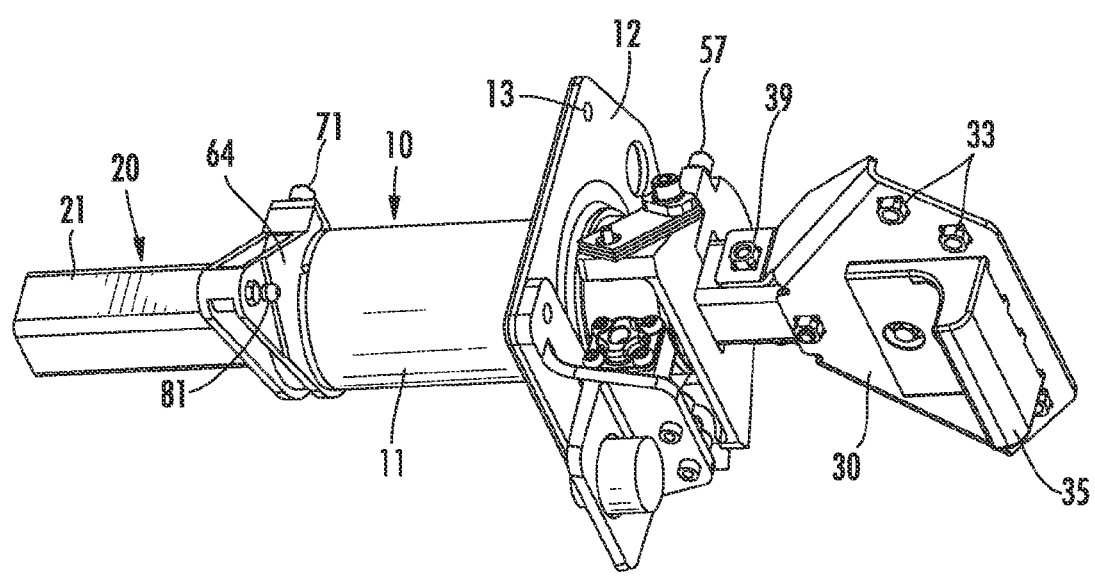
FIG. 1D is another perspective view of the telescoping steering system shown in FIG. 1A.

The assembled telescoping steering system will now be described with reference to the FIGS. 1A-2. As described above, the U-shaped member 26 of the telescoping mechanism 25 is inserted into the column shaft 21 such that the column shaft 21 extends over the telescoping mechanism 25 and the block member 28, and the column shaft 21 is attached to the handle bar bracket 30 via fasteners 39, 40, 43, and 44. When the column shaft 21 is attached to the handle bar bracket 30, the elongated holes 22 and 27 are aligned with one another, and the locking pin 23 is inserted into the elongated holes 22 and 27. The locking pin 23 is secured in the elongated holes 22 and 27 by E-ring 45 provided at both end portions of the locking pins. Prior to inserting and securing the locking pin 23 in the elongated holes 22 and 27, the telescoping bushings 54 as slid onto the column shaft 21 such that one of the telescoping bushings 54 is disposed on one side of the elongated holes 22 and 27 and another of the telescoping bushings 54 is disposed on the other side of the elongated holes 22 and 27, as shown in FIG. 2.

After the column shaft 21 and the telescoping mechanism 25 have been assembled, the case members 51 and 52 are disposed so as to surround the column shaft 21 with the lips 55 of each of the telescoping bushings 54 disposed in a respective slot 53 of the case member 51 and a respective slot 60 of the case member 52. The flanges 56 and 62 of the case members 51 and 52 are mated and attached to one another using the threaded fasteners 57.

Rotational bushings 72 are then disposed around the mated case members 51 and 52 as shown in FIG. 2. Once the rotational bushings 72 are disposed around the mated case members 51 and 52, the cylindrical portion 11 of the housing 10 is disposed around the case members 51 and 52 with the rotational bushings 72 disposed therebetween to facilitate and provide smooth rotation of the case members 51 and 52 with respect to the housing 10 when the steering column of the PWC is turned. When an end of the cylindrical portion 11 of the housing 10 is abutted against the flanges 56 and 62 of the mated case members 51 and 52, the ends of the case members 51 and 53 opposite to the flanges 56 and 62 extend from the corresponding end of the cylindrical portion 11.

With the cylindrical portion 11 of the housing 10 disposed around the mated case members 51 and 52, the arm member 64 and the clamping member 70 are fastened around the ends of the case members 51 and 52 opposite to the flanges 56 and 62, such that the housing member 10 is fixed in an axial direction of the column shaft 21 between the flanges 56 and 62 of the case members 51 and 52 at one end thereof and the arm member 64 and the clamping member 70 at the other end thereof. With this arrangement, the column shaft 21 is rotatably supported in the housing 10.

The telescoping movement of the column shaft 21 will now be described.

Figure 9:
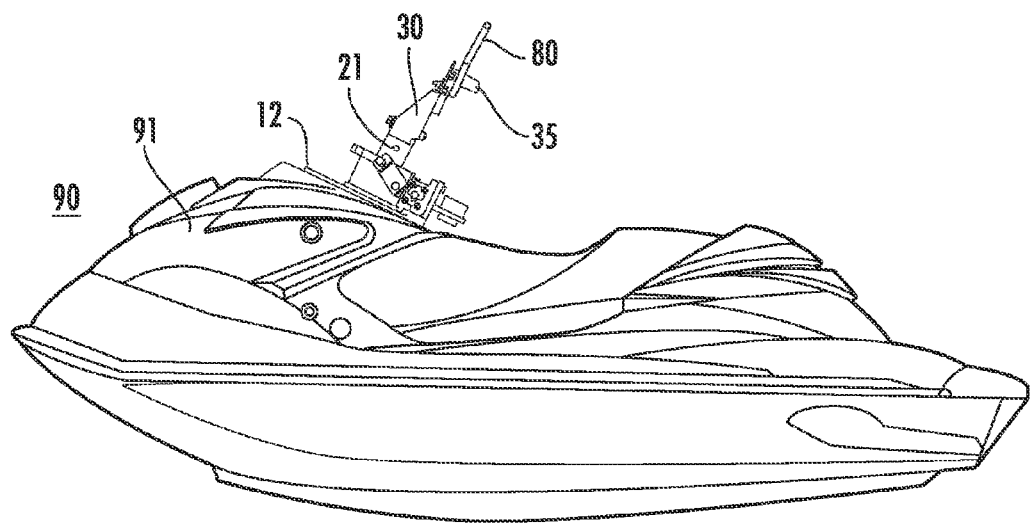
FIG. 9 is a side view of a PWC including the telescoping steering system shown in FIG. 1A in a retracted position.
Figure 10:
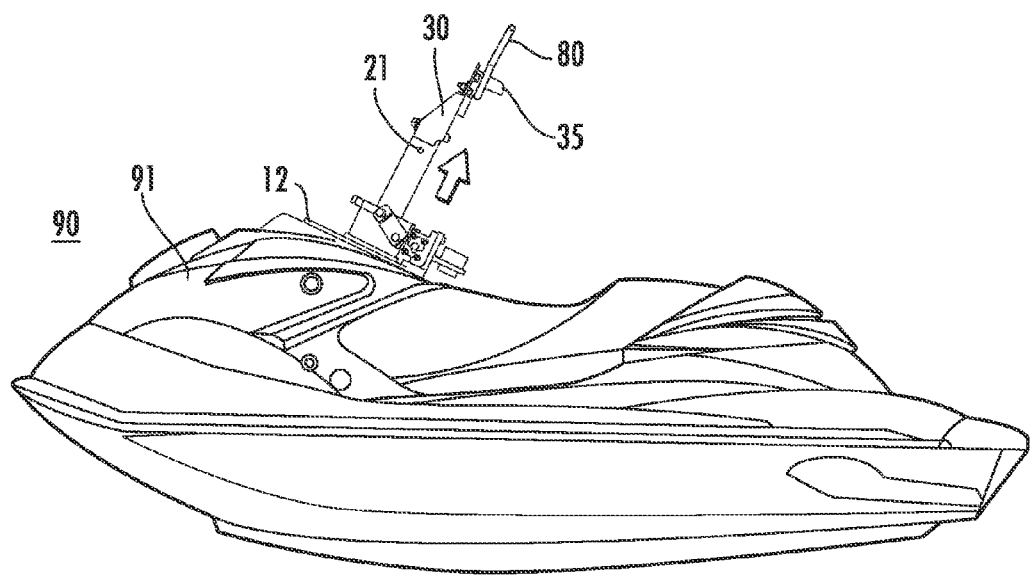
FIG. 10 is a side view of a PWC including the telescoping steering system shown in FIG. 1A in an extended position.

The lever 35 is biased towards the column shaft 21 by the biasing member 42. When the lever 35 is biased towards the column shaft 21, the locking pin 23 is disposed in opposed pairs of detents 66, which locks the height of the column shaft 21 and the handle bar bracket 30 in a fixed position. To change the height of the column shaft 21 and the handle bar bracket 30 attached thereto, the lever 35 is pulled upward away from the column shaft 21 which causes the locking pin 23 to move out of the opposed pair of detents 66. With the lever pulled upward away from the column shaft 21, the column shaft 21 can be move upwards or downwards to change the height of the column shaft 21 and the handle bar bracket 30 attached thereto. When the desired height is obtained, the lever 35 is allowed to return to its biased position, which, in turn, allows the locking pin 23 to be disposed in another of the opposed pairs of detents 66. FIG. 9 shows the PWC 90 with the column shaft 21 in a retracted position, and FIG. 10 shows the PWC 90 with the column shaft 21 in an extended position.

More specifically, the biasing member 42 pushes the locking pin 23 to the far right in the elongated opening 27 in FIG. 3B. which pushes the locking pin 23 against the bottom of the slots 65 or the bottom of one of the pair of detents 66 in FIG. 7B depending upon the location of the locking pin 23. When the lever 35 is pulled, the locking pin 23 is pushed to the left in the opening 27 shown in FIG. 3B, which allows the locking pin 23 to be easily moved in the slots 65.

In the present preferred embodiment, the range of movement of the column shaft 21 is preferably about 100 mm, for example. However, the range of movement of the column shaft 21 can be any suitable range depending upon the application. In addition, in the present preferred embodiment, three pairs of detents 66 are preferably provided, for example. However, any desired number of pairs of detents may be provided.

A spacer bracket 75 is preferably attached to the plate 12. The spacer bracket 75 includes a hole 76 provided therein which accommodates a warning light 77 or a sound buzzer, for example. However, the spacer bracket 75 may be omitted.

With the telescoping steering system according to the present preferred embodiment of the present invention, since the lever 35 is disposed in a central portion of the handle bar bracket, a driver of a PWC can easily operate the lever and adjust the height of the handle bars without removing their hands from the handle bar, which facilitates the adjustment of the height of the handle bars while operating the PWC. Most aggressive riders, such as racers, prefer to stand up rather than remain seated. At slow speeds, standing enables faster turning by enabling the rider to quickly transfer weight from one foot to another in order to facilitate turning of the PWC. At fast speeds, standing enables the rider to more effectively lean into a turn, and enables better shock absorption (through the legs) when jumping waves. The telescoping steering system according to this preferred embodiment of the present invention prevents the rider from having to lean over when operating the PWC is a standing position.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A steering system for a water vehicle comprising:
a housing having a substantially cylindrical member;
at least one case member extending through the substantially cylindrical member;
a column shaft extending through the at least one case member, including at least one elongated hole disposed on a side of the column shaft, and being arranged to move relative to the at least one case member and the housing in an axial direction of the column shaft; and
a telescoping mechanism partially disposed in the column shaft; wherein
the at least one case member includes a plurality of detents provided on an inner surface thereof;
the telescoping mechanism includes:
at least one elongated hole disposed at one end portion of the telescoping mechanism;
a locking pin extending through the at least one elongated hole in the telescoping mechanism and the at least one elongated hole in the column shaft; and
a lever disposed at an opposite end portion from the one end portion of the telescoping mechanism; wherein
the lever is movable to move the locking pin into and out of engagement with respective ones of the plurality of detents to enable the column shaft to be selectively moved relative to the at least one case member and the housing and fixed at a desired location relative to the at least one case member and the housing.

2. The steering system according to claim 1, wherein each of the at least one case member includes a flange at one end thereof that is engaged with one end portion of the substantially cylindrical member of the housing.

3. The steering system according to claim 2, further comprising:
an arm member; and
a clamping member; wherein
the at least one case member includes a pair of case members;
the arm member and the clamping member are disposed around an end of the pair of case members opposite to the one end of the at least one case member to clamp the pair of case members together; and
the arm member and the case members are engaged with an end of the substantially cylindrical member of the housing opposite to the one end thereof.

4. The steering system according to claim 1, further comprising:
a plurality of telescoping bushings disposed around the column shaft and including a lip portion; wherein
the at least one case member includes a plurality of slots arranged to receive the lip of a respective one of the plurality of the plurality of telescoping bushings therein so as to fix the locations of the plurality of telescoping bushings; and
the column shaft is slidable relative to the plurality of telescoping bushings.

5. The steering system according to claim 1, further comprising:
a plurality of rotational bushings disposed around the at least one case member and between the at least one case member and the substantially cylindrical member of the housing; wherein
the at least one case member is rotatable relative to the plurality of rotational bushings and the substantially cylindrical member of the housing.

6. The steering system according to claim 1, wherein
the telescoping mechanism further includes a substantially U-shaped member and a plate-shaped member extending from an end of the substantially U-shaped member;
the elongated holes of the telescoping mechanism are provided in opposed side surfaces of the substantially U-shaped member; and
the lever is attached to an end of the plate-shaped member opposite to the substantially U-shaped member.

7. The steering system according to claim 1, further comprising:
a handle bar bracket attached to an end of the column shaft; wherein
the lever is slidably attached to the handle bar bracket.

8. The steering system according to claim 7, further comprising:
a block member attached to the handle bar bracket; and
a biasing member disposed between the block member and a portion of the telescoping mechanism and arranged to bias the lever in a direction toward the housing.

* * * * *